July 28, 1953
F. A. JOHANSSON ET AL
2,646,821
MIXING VALVE
Filed July 17, 1947
2 Sheets-Sheet 1
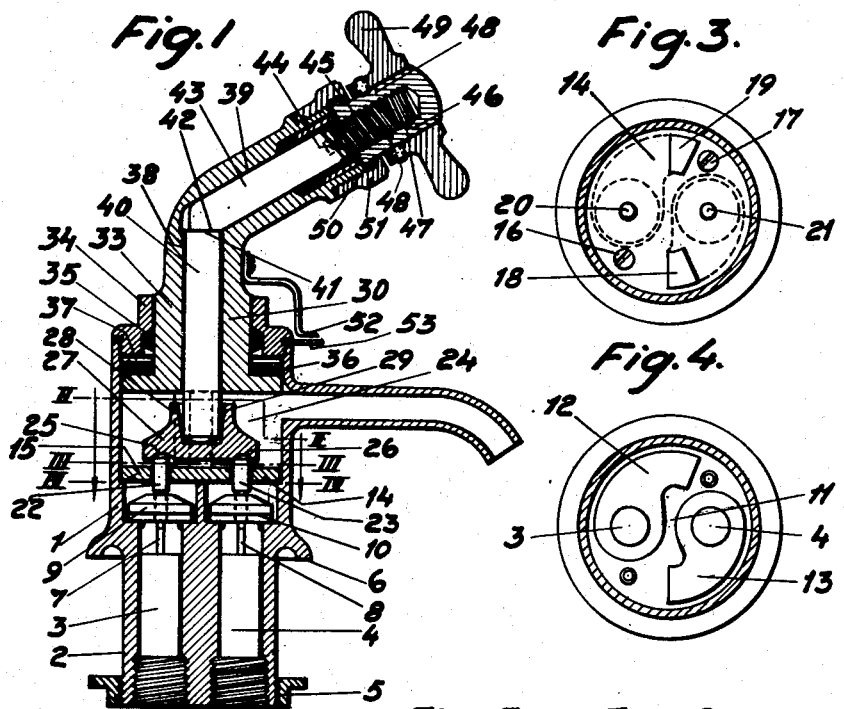
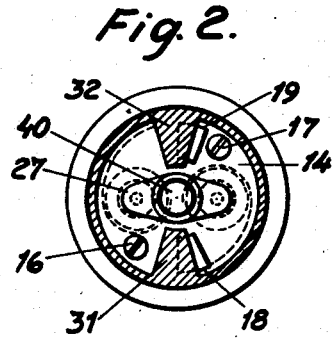
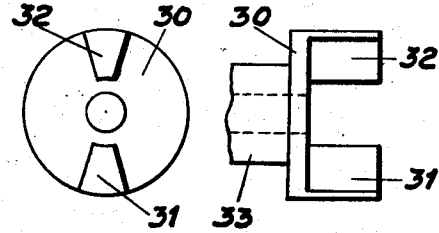
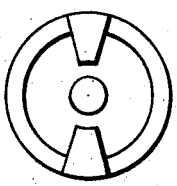
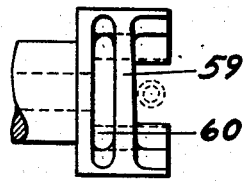
INVENTORS
Fredrik A. Johansson
Alfred Kåll
By Darby + Darby
ATTORNEYS July 28, 1953  F. A. JOHANSSON ET AL  2,646,821
MIXING VALVE
Filed July 17, 1947  2 Sheets-Sheet 2
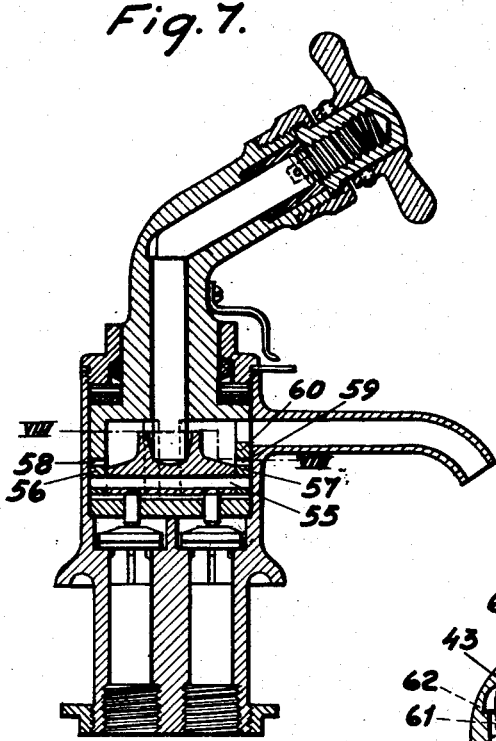
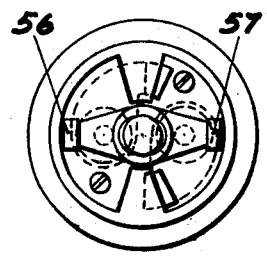
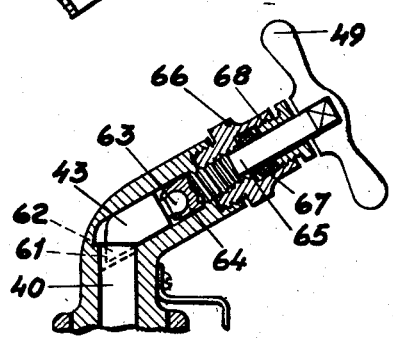
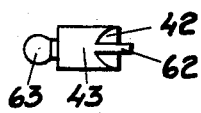
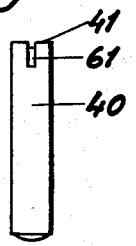
INVENTORS
Fredrik A. Johansson
Alfred Kåll
By Darby + Darby
ATTORNEYS

Patented July 28, 1953

2,646,821

UNITED STATES PATENT OFFICE 2,646,821

MIXING VALVE

Fredrik Amandus Johansson, Nockeby, Stockholm, and Alfred Kåll, Appelviken, Stockholm, Sweden Application July 17, 1947, Serial No. 761,506
In Sweden February 3, 1942

Section 1, Public Law 690, August 8, 1946
Patent expires February 3, 1962

5 Claims. (Cl. 137—637.4)

This invention refers to a mixing valve, and more particularly to a valve for hot and cold water in which both the quantity and the proportion of mixture of the water may be controlled by separate movements of one and the same operating element, and in which a hot water inlet and a cold water inlet are each provided with a stop valve, said valves being arranged adjacent one another and adapted to be operated via a yoke by means of a common opening and closing device. The mixing valve device is characterized by the fact that the valves comprise members operated from the opening and closing device by means of a pin provided in said device and adapted to be urged longitudinally therein for actuating a yoke, that is tiltably mounted with respect to said pin, and further by the fact that the proportion of the hot water to the cold water in the discharged mixture is rendered independent of the adjusted position of the pin by the presence of a control member located behind the valves in the direction of flow of the water.

In a valve according to the invention the hot water inlet and the cold water inlet may thus be shut off separately and have no communication with one another whatsoever when the valve is turned off, the member controlling the ratio between the warm and the cold water being in no way influenced thereby.

The invention is illustrated in the accompanying drawing, wherein:

Fig. 1 is a longitudinal section through a first embodiment of the invention.

Figs. 2, 3 and 4 are cross sections taken along the lines I—I, II—II and III—III in Fig. 1 as seen in the direction of the arrows.

Figs. 5 and 6 are a top and side view respectively of a detail of the valve.

Figs. 7–10 are sections or projections corresponding to Figs. 1, 2, 5 and 6 of a second embodiment.

Figs. 11–13 show details of a further embodiment.

The mixing valve according to Fig. 1 consists of a cylindrical casing 1, that is provided with a lower likewise cylindrical extension 2, in which are two parallel bores 3 and 4. The bores are at their lower ends provided with internal threads for connecting the former to a hot water pipe and a cold water pipe respectively. The extension 2 is provided at its lower end with an outer thread on which is screwed a nut 5, which in cooperation with a flange 6 at the bottom end of the casing 1 serves to fasten the valve in a washing basin or the like.

The blades 7 and 8 of two disc valves 9, 10 engage in the bores 3 and 4, each of the two valves being accommodated in its appropriate chamber 12 and 13 respectively, said chambers being separated by a partition 11. The bulgy, curved form of these chambers is shown in Fig. 4. The valve chambers 12, 13 are bordered at the top by a base disc 14, resting on an abutment 15 in the casing 1, and fastened by two screws 16, 17 screwed into threaded bores provided in the partition 11. The disc 14 is provided with two roughly trapezoidal apertures 18, 19, each of which is in communication with a valve chamber 12 and 13 respectively and both apertures are arranged on one and the same side of a diagonal of the disc 14 in such a way that the one edge of each aperture coincides with this diagonal (see Fig. 3).

In the base disc is bored a hole 20 and 21 (Fig. 3) respectively in front of each valve-disc 9, 10 said holes containing a pin 22 and 23 respectively whose lower end projecting into its respective valve chamber engages the top surface of its appropriate valve-disc, the other ends of the pins projecting into a mixing chamber 24 situated over the disc 14 and engaging inverted cup-like recesses 25, 26 in the underneath surface of an oblong yoke 27. The upper and the lower ends of the pins 22 and 23 are suitably somewhat rounded off, as shown. A lightly conical recess 29 is provided in an upright portion 28 of the upper surface of the yoke 27.

In the mixing chamber 24 is rotatably mounted a control member 30, which has two downwardly projecting diagonally opposed shoulders 31, 32, each of which is adapted to cooperate with its respective trapezoidal aperture 18, 19 in the base disc 14 (see Fig. 2). The control member 30 has a stemlike extension 33 and is retained in the casing 1 by means of a nut 34 screwed therein. The numerals 35 and 36 designate suitable packings and 37 is a spring that tends to urge the control member 30 in a downward direction in the casing 1, so that its shoulders 31 and 32 will contact the base disc 14.

The stemlike extension 33 is angularly bent at a point somewhat outside the casing, as shown in Fig. 1, and two intersecting bores 38, 39 are provided therein. The bore 38 extending parallel to the centre axis of the casing 1 is provided with a pin 40, the lower end of which is somewhat rounded off and engages the recess 29 in the yoke 27, so that the latter may adjust itself with respect to the pin for compensating possible differences of thickness of the packings and thereby guarantee an effective sealing. The upper end of the pin 40 is cut off perpendicular to its longitudinal axis, as shown at 41, and cooperates with an obliquely cut plane surface 42 of a pin 43 provided in the bore 39. The last mentioned pin 43 is prevented from rotating in the bore by means of a pin 44 and a conjunctive slot, or by any other suitable means. The upper end of the pin 43 is provided with a thread, as shown at 45, and engages the threaded bore 46 of a sleeve 47, to which a hand wheel 49 is fastened by means of screws 48. The sleeve 47 is at its lower end provided with a flange 50 extending into an annular space between the upper end of the stemlike extension 33 and a nut 51 screwed thereon. The sleeve 47 is thus rotatable but locked against axial movement.

On the stemlike extension 33 is fixed an arrow 52 or the like adapted to work in conjunction with a scale 53 on the casing 1. The outlet from the mixing chamber 24 is designated by 54.

The valve operates as follows:

In the position shown in Fig. 1 the disc-valves 9, 10 are pressed against their seats by the pins 43, 40 the yoke 27 and the pins 22, 23. Thus the hot and the cold water inlets 3 and 4 are sealed separately without any possibility of communication with one another. When the valves 9 and 10 are to be opened, the hand wheel 49 is turned, whereby the pin 43 is drawn upwards in the bore 39, its obliquely cut surface 42 likewise moving in an upward direction. This enables the hot and cold water under pressure to lift the disc-valves 9, 10 and simultaneously urge the pins 22 and 23, the yoke 27 and the pin 40 upwards. The valves 9, 10 are thereby equally opened, the degree of opening depending upon the number of times the handwheel has been turned.

Hot water and cold water may now flow into the mixing chamber 24 through the trapezoidal openings 18, 19 in the base disc 14 (see Fig. 2). The ratio of the amount of hot water to that of cold water is controlled by turning the control member 30, the turning being effected by the fixed grip of the hand on the handwheel 49. By turning the control member in one direction from the intermediate position shown in Fig. 2, one of the openings 18, 19 will be gradually closed, the other opening being gradually opened by means of the shoulders 31, 32 and when the control member is turned in the opposite direction, the same occurs but the ratio of the amount of hot water to that of the cold water being reversed. In this manner the mixing ratio may be adjusted to any desired degree including the total sealing of the passage of either the hot water or the cold water.

In accordance with the embodiment illustrated in Figs. 7–10 most of the details coincide substantially with those of Figs. 1–6 the only exceptions being the following modifications:

The recess 29 in the yoke member 27 is not strictly conical as in the preceding case, but somewhat oblong with two opposed sides parallel, the two remaining opposed sides being conical (see Fig. 8) so that the yoke member may perform only one sort of motion relative to the pin 40 engaging in the recess 29, namely, a rocking motion about an axis, vertical to the plane of Fig. 7. A pin 55 extends longitudinally through the yoke 27, rollers 56 and 57 being mounted on the two ends of the said pin. The control member 30, besides being provided with the shoulders 31, 32, is also provided with two diametrically opposed cams 58, 59 each of which is adapted to cooperate with its respective roller 56, 57. The cams 58, 59 are straight and are inclined in the same direction and by an equal amount relative to the central line of the control member, for which reason they coincide in the side view shown in Fig. 10. An oblong outlet 60 is also arranged in the control member.

This device is operated as follows:

On turning the hand wheel 49 the valves 9, 10 are opened in the same way as in the embodiment shown in Figs. 1–6. When the control member 30 is thereafter rotated in the casing 1, the yoke member 27 will due to the direction of rotation of the handwheel will be tilted in one direction or the other in response to the cooperation of the rollers 56, 57 with the respective cams 58, 59, whereby the one disc-valve will be pressed downwards, the other valve being permitted to open more than before. Simultaneously a corresponding opening and closing movement will be effected at the apertures 18, 19 controlled by the shoulders 31, 32, so that a double and very effective control of the supply of the hot and the cold water is obtained. The control of the proportion of mixture may be effected, if desired, merely by the aid of the disc-valves, in which case the position of the shoulders 31, 32 or other support members corresponding thereto would have to be modified.

According to Fig. 11 which illustrates a modified embodiment of the operating device, the pin 40 is provided in its upper end with a slot or a recess 61 with inclined bottom, and the pin 43 has at its lower end a triangular lap 62 engaging in this slot, the said lap preventing the relative rotation of the two pins and thereby substitutes the pin 44 and the slot cooperating therewith according to Figs. 1 and 7. The pin 43 is provided at its upper end with a knob 63 or the like, that is revolvably carried by a socket 64 mounted on the lower end of a threaded spindle 65 carrying the hand wheel, the spindle being screwed into a nut 66, the latter being screwed into the upper end of the stem portion 33. The numeral 67 designates a packing held by a gland 68. Figs. 12 and 13 are side views of the pins 43 and 40 respectively.

Having now described our invention, what we claim as new and desire to secure by letters patent is:

1. A mixing valve for controlling the total flow and proportioning of two liquids, the valve comprising, in combination, a valve casing having a mixing chamber therein, said mixing chamber having two inlets thereto, one associated with each of two liquids and a common oulet therefrom for the mixture of the two liquids, a regulating valve in each inlet, a flow control valve connected in series with each said regulating valve and on the inlet side of the regulating valve, a yoke engaging both of said flow control valves, means comprising a reciprocable operating rod engaging with and operating said yoke, a sleeve rotatably mounted in said casing, said sleeve having an angled extension thereon, said reciprocable operating rod being mounted in the bore in said sleeve, a handle screw-threadedly mounted in said angled extension, said handle having a portion reciprocably mounted in a bore in said angled extension, said portion terminating in a wedge member cooperating with the end of said reciprocable rod and means on said sleeve comprising downwardly extending portions cooperating with an apertured plate to form said regulating valves whereby rotation of said sleeve about its own axis adjusts the proportion of the two liquids admitted to said mixing chamber and rotation of said handle about its axis adjusts the total flow into the mixing chamber.

2. A mixing valve for controlling both the quantity and proportioning of two liquids comprising, in combination, a valve casing, a mixing chamber formed therein, a pair of inlet passages and an outlet passage in said casing, a regulating valve in each inlet passage, a flow control valve in each inlet passage on the inlet side of said regulating valves, a yoke engaging both said flow control valves, a sleeve rotatably mounted in said valve casing and coaxial with respect thereto, a reciprocable operating rod mounted in said yoke, an operating handle rotatably mounted in an angled extension of said sleeve, a wedge member cooperating with the upper end of said reciprocable rod, said member being reciprocable in a bore in said angled extension and being screw-threadedly connected to said handle, means for preventing rotation of said member, said means comprising a pin extending transversely through said member and into the walls of said bore in said angled extension, and downward diametrically opposite extensions on said sleeve, said extensions cooperating with apertures in said inlet passages to form said regulating valves whereby rotation of said operating handle about its own axis serves to reciprocate said wedge and said rod to simultaneously open and close said flow control valves and oscillation of said sleeve about its axis and that of the valve casing serves to adjust said regulating valves in opposite directions to regulate the proportion of liquids entering the mixing chamber.

3. A device as claimed in claim 2, characterized in that said wedge member is provided with a projection and said reciprocatory operating rod is provided with a groove at its uppper end, said projection entering into said groove and serving to present rotation of said wedge and of said operating rod.

4. A mixing valve for controlling both the quantity and proportioning of two liquids comprising, in combination, a valve casing, a mixing chamber formed therein, a pair of inlet passages and an outlet passage in said casing, a regulating valve in each inlet passage, a flow control valve in each inlet passage on the inlet side of said regulating valves, a yoke engaging both said flow control valves, a sleeve rotatably mounted in said valve casing and coaxial with respect thereto, a reciprocable operating rod mounted in said yoke, an operating handle screw-threadedly mounted in an angled extension of said sleeve, a wedge member cooperating with the upper end of said reciprocable rod, said member being reciprocably mounted in said angled extension, a ball and socket connection between said handle and said wedge member, and downward diametrically opposite extensions on said sleeve, said extensions cooperating with apertures in said inlet passages to form said regulating valves whereby rotation of said operating handle about its own axis serves to reciprocate said wedge and said rod to simultaneously open and close said flow control valves and oscillation of said sleeve about its axis and that of the valve casing serves to adjust said regulating valves in opposite directions to regulate the proportion of liquids entering the mixing chamber.

5. A device as claimed in claim 4, characterized in that said wedge member is provided with a porjection and said reciprocatory operating rod is provided with a grooove at its upper end, said projection entering into said groove and serving to present rotation of said wedge and of said operating rod.

FREDRIK AMANDUS JOHANSSON.
ALFRED KÅLL.

References Cited in the file of this patent

UNITED STATES PATENTS

| Number | Name | Date |
|---|---|---|
| 1,095,003 | Leonard | Apr. 28, 1914 |
| 1,886,889 | Krupp | Nov. 8, 1932 |
| 2,083,360 | Brinkman | June 8, 1937 |
| 2,322,157 | Porter | June 15, 1943 |